(12) United States Patent
Lozovsky et al.

(10) Patent No.: US 12,448,263 B2
(45) Date of Patent: Oct. 21, 2025

(54) SYSTEM FOR MONITORING THE LOCATION AND LOAD STATUS OF A WHEELED PLATFORM

(71) Applicant: HOOPO SYSTEMS LTD., Raanana (IL)

(72) Inventors: Ilan Lozovsky, Kfar-Sirkin (IL); Erez Aviv, Raanana (IL); Menachem Tipris, Hod Hasharon (IL)

(73) Assignee: HOOPO SYSTEMS LTD., Raanana (IL)

( * ) Notice: Subject to any disclaimer, the term of this patent is extended or adjusted under 35 U.S.C. 154(b) by 85 days.

(21) Appl. No.: 18/564,107

(22) PCT Filed: Jun. 16, 2022

(86) PCT No.: PCT/IB2022/055590
§ 371 (c)(1),
(2) Date: Nov. 27, 2023

(87) PCT Pub. No.: WO2022/269417
PCT Pub. Date: Dec. 29, 2022

(65) Prior Publication Data
US 2024/0262663 A1    Aug. 8, 2024

Related U.S. Application Data (60) Provisional application No. 63/212,687, filed on Jun. 20, 2021.

(51) Int. Cl.
*B66F 9/24* (2006.01)
*B66F 9/06* (2006.01)
*B66F 9/075* (2006.01)
*H04L 7/00* (2006.01)

(52) U.S. Cl.
CPC ............ *B66F 9/0755* (2013.01); *B66F 9/063* (2013.01); *B66F 9/24* (2013.01); *H04L 7/0008* (2013.01)

(58) Field of Classification Search
CPC .......... B66F 9/0755; B66F 9/063; B66F 9/24; H04L 7/0008
See application file for complete search history.

(56) References Cited

U.S. PATENT DOCUMENTS

2006/0022800 A1    2/2006 Krishna et al.
2016/0344536 A1*  11/2016 Kumar ................ G06F 13/4291
2019/0339354 A1   11/2019 Hyatt et al.
(Continued)

FOREIGN PATENT DOCUMENTS

JP    6562716 B2    8/2019

*Primary Examiner* — Mathew Franklin Gordon
(74) *Attorney, Agent, or Firm* — AlphaPatent Associates Ltd.; Daniel J. Swirsky (57) ABSTRACT

A load and location tracking system installed at a first position on a wheeled platform, the load monitor is configured to sense a set of load related attributes and to wirelessly transmit the set of load related attributes in a first transmission and a location tracker device installed at a second position on the wheeled platform, the location tracker is configured to wirelessly receive the first transmission, sense a set of location related attributes and wirelessly transmit the load related attributes taken from the first transmission, the sensed location related attributes and an identifier identifying the wheeled platform to an application.

15 Claims, 5 Drawing Sheets

(56) References Cited

U.S. PATENT DOCUMENTS

| | | |
|---|---|---|
| 2020/0244297 A1 | 7/2020 | Zalewski et al. |
| 2021/0147202 A1* | 5/2021 | Black .................. G05D 1/0212 |
| 2022/0135384 A1* | 5/2022 | Takayama ............... B66F 9/063 |
| | | 701/50 |

* cited by examiner

SYSTEM FOR MONITORING THE LOCATION AND LOAD STATUS OF A WHEELED PLATFORM

FIELD

The invention relates to the field of communication technology in general, and in particular to determine location and load status of transportable platforms.

BACKGROUND

Motorized vehicles in managed fleets are commonly equipped with multiple-access serial data communications networks to enable data transfers between various electronics within the vehicle and certain existing systems include GPS and a load sensor that communicate with a computerized device on board the vehicle and communicate with a back office.

However, fleets of nonautomotive platforms designed to be hauled (e.g., trolleys, dollies chassis, etc.) for moving objects from one location to another, such as the ones commonly used in airports, harbors and other places where objects should be moved from one location to another, are difficult to track and monitor due to the lack of inherent power-source on-board, and the absence of long-lasting, battery-operated, and cost-efficient devices.

SUMMARY

There is provided, in accordance with an embodiment of the invention, a load and location tracking system. The system includes a load monitor device installed at a first position on a wheeled platform, the load monitor is configured to sense a set of load related attributes and to wirelessly transmit the set of load related attributes in a first transmission and a location tracker device installed at a second position on the wheeled platform, the location tracker is configured to wirelessly receive the first transmission, sense a set of location related attributes, and wirelessly transmit the load related attributes taken from the first transmission, the sensed location related attributes and an identifier identifying the wheeled platform to an application.

Moreover, in accordance with an embodiment of the invention, the load monitor and the location tracker use a low-power communication protocol.

Furthermore, in accordance with an embodiment of the present invention, the load monitor device includes a plurality of load sensors and a plurality of additional sensors, wherein each additional sensor is any of: an accelerometer, a proximity sensor, a light sensor, a Near Field Communication (NFC) sensor and a sound sensor.

Still further, in accordance with an embodiment of the present invention, the location tracker device comprises a location sensor and a plurality of additional sensors wherein each additional sensor is any of: an accelerometer, a proximity sensor, a light sensor, a Near Field Communication (NFC) sensor and a sound sensor Moreover, in accordance with an embodiment of the present invention, a clock of the location tracker is synchronized with a clock of the load monitor to match an agreed and coordinated timeslot wherein the load monitor configured to start transmitting in the agreed and coordinated timeslot and the location tracker configured to start receiving in the agreed and coordinated timeslot.

Additionally, in accordance with an embodiment of the present invention, the load monitor device is configured to repeatedly transmit in a specific frequency for a first duration and the location tracker device is configured to receive for a second duration.

Additionally, in accordance with an embodiment of the present invention, the timeslot and the duration depend on a time elapsed from a previous reception of the first transmission.

Further, in accordance with an embodiment of the present invention, the load monitor device is configured to transmit when a first condition is met, and the location tracker device is configured to receive when a second condition is met, the first and second conditions depend on any of: location, motion characteristics, environmental conditions and time.

Still further, in accordance with an embodiment of the present invention, the system includes an application running on a computing device with a processor and a memory, the application configured to receive the load related attributes, the location related attributes and the identifier and present the location, the load and the identifier on a display.

Additionally, in accordance with an embodiment of the present invention, the application is configured to learn states associated with change of the load related attributes, and to send a first command to the location tracker, the first command includes configuration parameters related to the first and the second conditions, and the location tracker configured to send a second command to the load monitor the second command includes configuration parameters related to the first condition.

There is provided, in accordance with an embodiment of the invention, a method for tracking a location and a load status of a wheeled platform. The method includes sensing by a first device, installed in a first position on the wheeled platform, one or more load-related attributes, wirelessly transmitting from the first device a first transmission including the load related attributes to a second device. The method also includes wirelessly receiving by the second device, installed in a second position on the wheeled device, the first transmission, sensing by the second device one or more location-related attributes; sending from the second device the load related attributes extracted from the first transmission, the location-related attributes and an identifier identifying the wheeled platform and receiving by an application the load-related attributes, the location-related attributes and the identifier and providing information related to a location and a load of the wheeled platform.

Additionally, in accordance with an embodiment of the invention, the transmitting and receiving operations use a low-power communication protocol.

Moreover, in accordance with an embodiment of the invention, the wirelessly transmitting further includes receiving a trigger, the trigger depends on location attributes, motion characteristics, environmental conditions and time; sensing the load related attributes after receiving the trigger; evaluating a load condition by comparing the load-related attributes with a preconfigured load state; and start wirelessly transmitting the load related attributes in a coordinated timeslot, in a specified frequency for a configured duration if the condition is satisfied.

Furthermore, in accordance with an embodiment of the invention, the wirelessly receiving further includes waiting for the coordinated timeslot, listening for a configured duration, the duration depends on a time elapsed from a previous reception of the first transmission and updating a clock according to the first transmission.

Still further, in accordance with an embodiment of the invention, the method further includes updating the configured duration when a condition is met, the condition depends on a location, motion characteristics, environmental status and time.

BRIEF DESCRIPTION OF THE DRAWINGS

The invention will now be described in relation to certain examples and embodiments thereof with reference to the following illustrative drawing figures so that it may be more fully understood. In the drawings.

It will be appreciated that for simplicity and clarity of illustration, elements shown in the drawing figures have not necessarily been drawn to scale. For example, the dimensions of some of the elements may be exaggerated relative to other elements for clarity. Further, where considered appropriate, reference numerals may be repeated among the drawing figures to indicate the same or analogous elements.

DETAILED DESCRIPTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Embodiments of the invention provide systems and methods for providing load and location tracking information related to wheeled platforms such as dollies, trolleys, chassis, and other wheeled platform used for moving objects using internet of things (IoT) devices.

IoT devices are nonstandard computing devices that connect wirelessly to a network and have the ability to transmit data. IoT involves extending internet connectivity beyond standard devices to any range of traditionally non-internet-enabled physical devices and everyday objects. Embedded with technology, these devices can communicate and interact over a network and can be remotely monitored and controlled.

The system comprises battery-operated IoT devices to install on the platform and an application. One specialized battery operated IoT device, referred herein as load monitor, can be installed on the platform (e.g., dolly) underneath the potential load to report the load status, and a second specialized battery operated IoT device, referred herein as location tracker, can be installed on the platform in an installation location with RF communication ranges where it can communicate with other RF devices or cellular networks.

Embodiments of the invention keep the installation simple and safe by using a wireless communication between the IoT devices avoiding cabling while saving energy by utilizing Low-Power, communication protocols and employing methods to minimize the communication to further reduce battery consumption.

Figure 1:
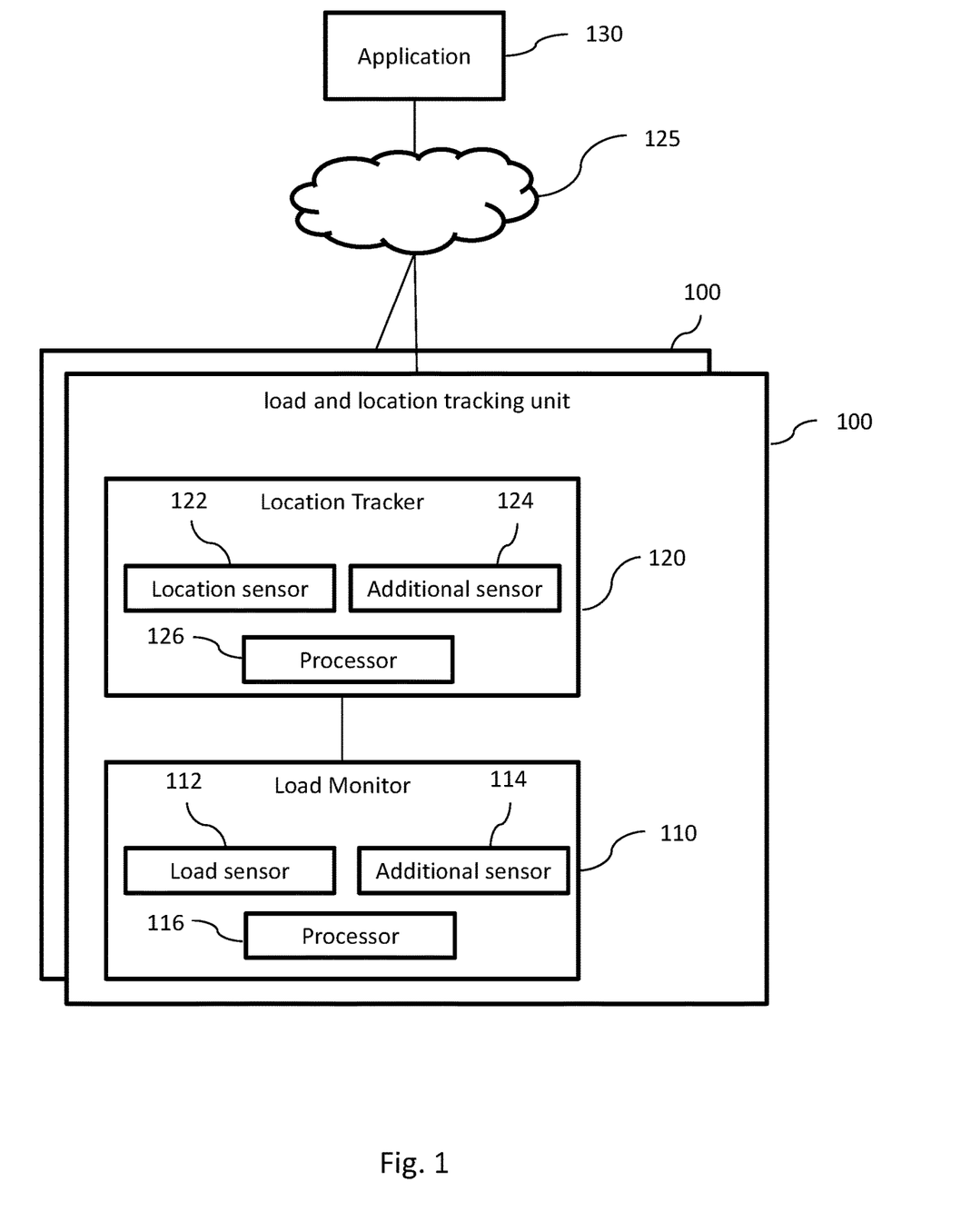
FIG. 1 is a schematic illustration of is a schematic illustration of a load and location tracking system, constructed and operative in accordance with an embodiment of the present invention.

FIG. 1, to which reference is now made, is a schematic illustration of a load and location tracking system 10 constructed and operative in accordance with an embodiment of the present invention. Load and location tracking system 10 provides energy efficient battery-operated specialized IoT devices that may be installed on a platform (e.g., dolly/chassis) and provide load and location information for a long duration of time.

Load and location tracking system 10 comprises one or more load and location tracking units 100, each installed on a different platform (e.g., a towable non-motorized vehicle such as dolly/chassis), and an application 130 installed on a server accessible through a network 125. Application 130 may receive transmissions from a plurality of load and location tracking units 100 and provide useful information to a user based on the received transmissions.

Load and location tracking unit 100 has a unique identifier (ID) (for the purpose of distinguishing between the units) and comprises one or more load monitor IoT devices 110 and a location tracker IoT device 120 communicating over the air with each other. Each IoT device of load and location tracking unit 100 may be installed separately on a different location on the platform dolly/chassis that best fits its functionality.

Load monitor 110 may sense load status and communicate to location tracker 120 the sensed information. Location tracker 120 may receive information from load monitor 110, determine its own location and send the information to application 130 over network 125 (e.g., the internet). Application 130 may display the location and load status of the dollies to a user for example in a screen using a graphical user interface.

Load monitor 110 comprises one or more load sensors 112, one or more additional sensors 114 and a processor 116. Load sensors 112 may sense the presence of a load, additional sensors 114 may sense various states related to the device and processor 116 may have access to sensed data, perform some logic and transmit information (e.g., load status) over the air using any wireless communication protocol.

Load sensor 112 may comprise any sensing element known in the art, capable of sensing the existence of load. Load sensor 112 may be a mechanical sensor (microswitch), a radio frequency (RF) sensor, an electromagnetic sensor, a capacity change sensor, a radar and the like.

Sometimes sensing the existence of a load may not be enough and information related to the type of load may also be important. For example, the user may want to distinguish between cases where the load is a unit load device (ULD) and the case where platforms are stacked on top of each other, for example when they are relocated from one location to another. When the information related to the type of load is desired, a radar may be used as a load sensor 112. Load monitor 110 may use information from the radar to identify the type of cargo and not only its existence.

Additional sensors 114 may include any type of sensor that may provide additional information taken into consideration during the operation of load monitor 110 including an accelerometer, a proximity sensor, a light sensor, a sound sensor and the like. Load sensor 110 may use information collected by additional sensors 114 in its flows as described herein below.

Processor 116 may be any processor capable of receiving information from the plurality of sensors, process the information, apply some logic and communicate (transmit and receive) over the air. Processor 16 may include a computing element, a communication element capable of transmitting and receiving communication over the air and a memory. The communication may be based on any know protocol such as WiFi, BLE, Cellular, LPWA or any other wireless communication protocols.

Location tracker 120 comprises one or more location sensors 122, one or more additional sensors 124 and a processor 126. Location sensor 122 may sense information associated with location (information from which a location may be identified), additional sensors 124 may sense various states and processor 126 may have access to sensed data, perform some logic and transmit information (e.g., load, location, ID) over the air using any wireless communication protocol.

Location sensor 122 may comprise any sensing element known in the art, capable of sensing information related to location. Location sensor 122 may be a GPS, a WiFi or an IoT node as the one described in international application publication no. WO 2020/188557A1, assigned to the common assignee of the invention.

Additional sensors 124 may include any type of sensor including an accelerometer, proximity sensor, light, Near Field Communication (NFC) sensor, sound sensor and the like. It may be noted that additional sensors 124 mounted in location tracker 120 may be the same or may be different than the ones mounted on load monitor 110 and each IoT device may consider its own collected information and any received information in its logic.

Location tracker 120 may use information collected by additional sensors 124 in its flows as described herein below.

Processor 126 may be any processor capable of receiving information from the plurality of sensors, process the information, apply some logic and communicate (transmit and receive) over the air. Processor 16 may include a computing element, a communication element and a memory. Processor 126 may transmit and receive data (e.g., load, location related information, ID) over the air using any know protocol such as WiFi, BLE, Cellular, LPWA or any other wireless communication protocols.

It may be noted that load monitor 110 and location tracker 120 of a load and location tracking unit 100 may use the same communication protocol for their intra communication, and location tracker 120 may use any other protocol to communicate with application 130.

Processor 126 may receive transmissions from one or more load monitors 110 and send data to application 130. Processor 126 may further receive transmission from application 130 (e.g., configuration parameters) and send it to the load monitors 110.

Application 130 may receive various information from a plurality of load and location tracking units 100 (over the network, e.g., internet) each unit installed on a dolly/chassis/platform. Application 130 may store in information in a database and may display the current information on a display, possibly on a map of the area. Application 130 may further provide various statistics including number and percentage of unloaded dollies/chassis, the time each dolly/chassis was loaded and or empty (i.e., not loaded), the time between loading and unloading of each dolly and an average time between loading and unloading of all dollies, and any other business information that can be extracted from the information received from load and location tracking units 100.

Figure 2:
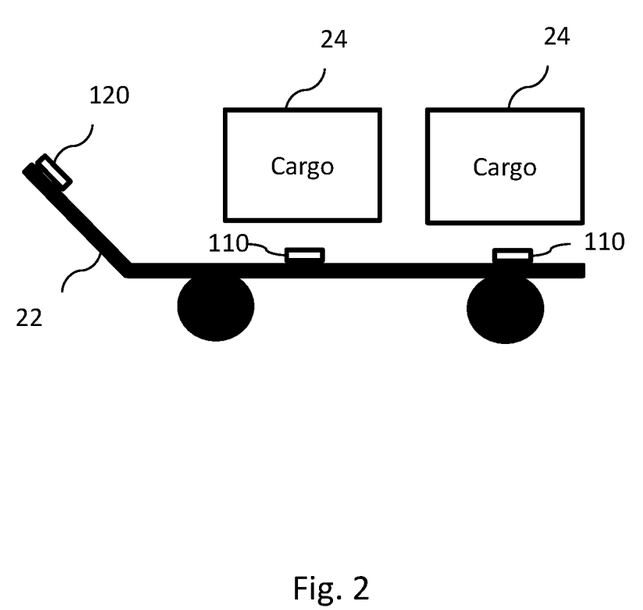
FIG. 2 is a schematic illustration of an exemplary installation of a load and location tracking unit on a dolly.

FIG. 2, to which reference is now made, is a schematic illustration of an exemplary installation of a load and location tracking unit 100 on a dolly 22 on which cargo units 24 may be loaded. Load monitor 110 may be installed on the body of the dolly in one or more location to be underneath cargo 24 and location tracker 120 may be installed in a spot with RF communication ranges to be able to communicate with other RF devices.

To save the battery of load monitor 110, it may be configured to send information (e.g., load) for a configured duration after a trigger has been raised (instead of periodically sending the information, e.g., every second). The trigger may depend on a combination of one or more states sensed by any of load sensors 112 and/or any of additional sensors 114 and/or a state evaluated by processor 116. The conditions that may activate a trigger may be start moving, stop moving, accelerating, decelerating, detection of a nearby object, a configurable time has elapsed, detection of light and the like.

The triggers and the rules for raising a trigger, including the list of events, thresholds, logic and the like may be configured on load monitor 110 and may be modified any time by application 130.

Figure 3:
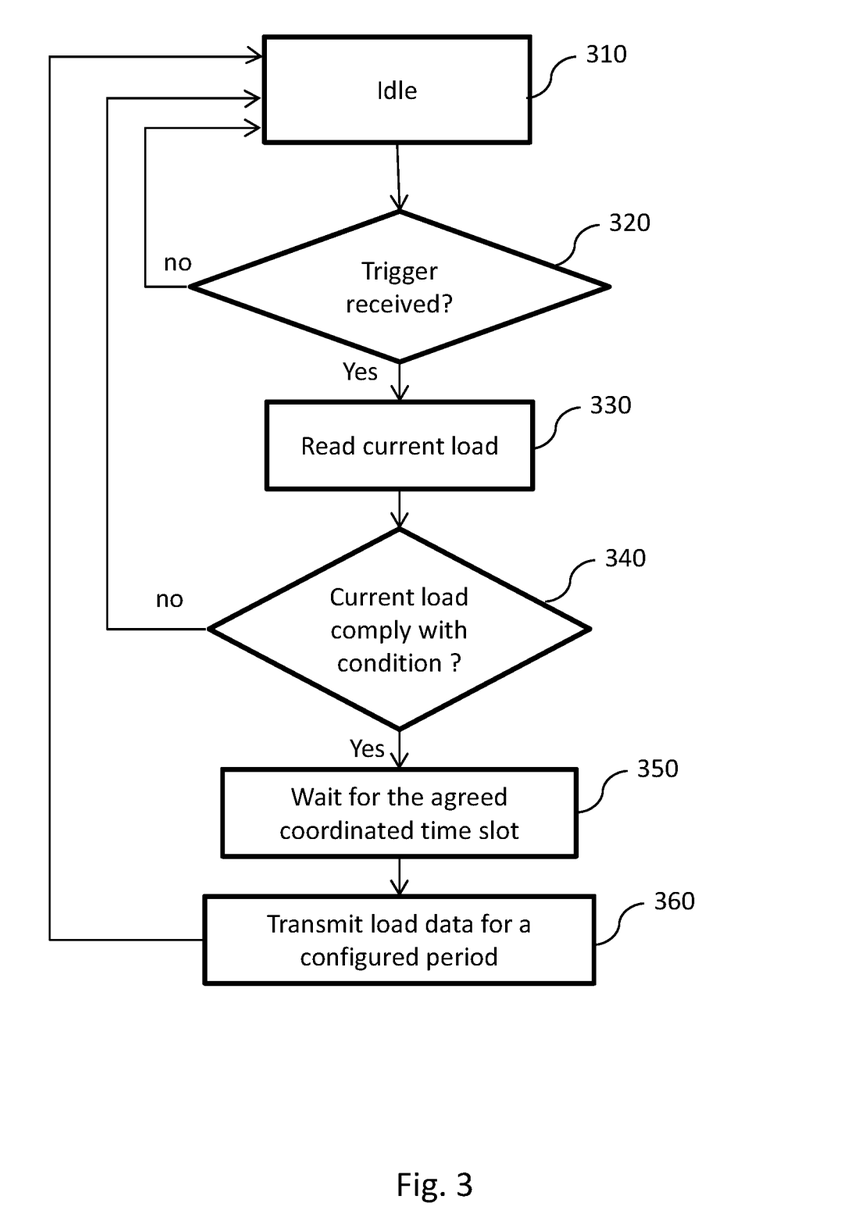
FIG. 3 is s a schematic illustration of a flow for controlling a transmit operation of a load monitor IoT device, constructed and operative in accordance with an embodiment of the present invention.

FIG. 3, to which reference is now made, is a schematic illustration of a flow for controlling a transmit operation of load monitor 110 that may be implemented by processor 116.

The flow may start in step 310 in which load monitor 110 is in an idle state waiting for a trigger. It may be noted that in this state, the battery consumption is minimal. In step 320, processor 116 may check if a trigger has been received and if not, return to the idle state in step 310. If a trigger has been received, processor 116 may read current load (from load sensor 112). In step 340 the load status may be evaluated (e.g., compare between the sensed load and certain conditions) to determine if it complies with a condition. The evaluation may include logic such as load reaches or crossed a threshold, load has changed, load did not change for a configurable time and the like. If the load does not comply with the condition, processor 116 may return to the idle state in step 310. If the load complies with the condition, processor 116 may continue to step 350 and wait for an agreed coordinated timeslot for sending a transmission. When the agreed coordinated timeslot arrives processor 116 may continue to step 360 where it may repeatedly transmit information such as the load for a configured duration. After the transition duration ends, processor 116 may return to the idle state in step 310.

To save battery of location tracker 120, it may be configured to listen for information (potentially transmitted by load monitor 110) for a configured duration in specific agreed and coordinated timeslots (e.g., full second). During the configured timeslot, location tracker 120 may start listening for a configurable duration. The configurable timeslot and duration may ensure that if load monitor 110 transmitted something, location tracker 120 will receive it for certain. It may be noted that after some time the clock of location tracker 120 drifts apart and gradually desynchronizes from the clock of load monitor 110. Therefore, the listening duration of location tracker 120 may be increased as the time from a received transmission grows and decreased back to a minimum size after receiving a transmission and updating its clock.

Location tracker 120 may further optimize the listening frequency and durations to further reduce battery consumption by taking into consideration the state of the dolly before a listening. For example, location tracker 120 may not listen at all in conditions such as: during movement (it is not likely that the load will change when a dolly is moving).

Location tracker 120 may increase the frequency of listening when the probability that the load may change is higher. It is more probable that the load will change when movement has started or stopped (i.e., the dolly may be loaded before it started moving and may be unleaded after it stopped moving).

It is more probable that the load will change in specific locations (i.e., the dolly is located in the loading place or in the destination place) or when detecting a nearby object, some light or sound conditions and the like.

Location tracker 120 may increase the frequency of listening after some time has passed since the last received communication, or in other situation where it is more probable to receive transmissions. Location tracker 120 may use information related to the transmission in a synchronization procedure intended to keep the clocks of location tracker 120 and load monitor 110 synchronized.

It may be noted that it is important to keep the clocks of location tracker 120 and load monitor 110 synchronized to ensure that they transmit and receive in the same timeslots.

Location tracker 120 may also increase or decrease the listening duration i.e., change the size of the listening timeslot (in addition to changing the listening frequency) in circumstances such as in specific locations, after changes in movement, starting or stopping motion, accelerating, decelerating, detecting of a nearby object, a configurable time has elapsed, a light or a sound has been detected and the like.

It may be noted that the logic applied for changing the size of the timeslot may be identical or different than the logic applied for changing the frequency and duration).

Figure 4:
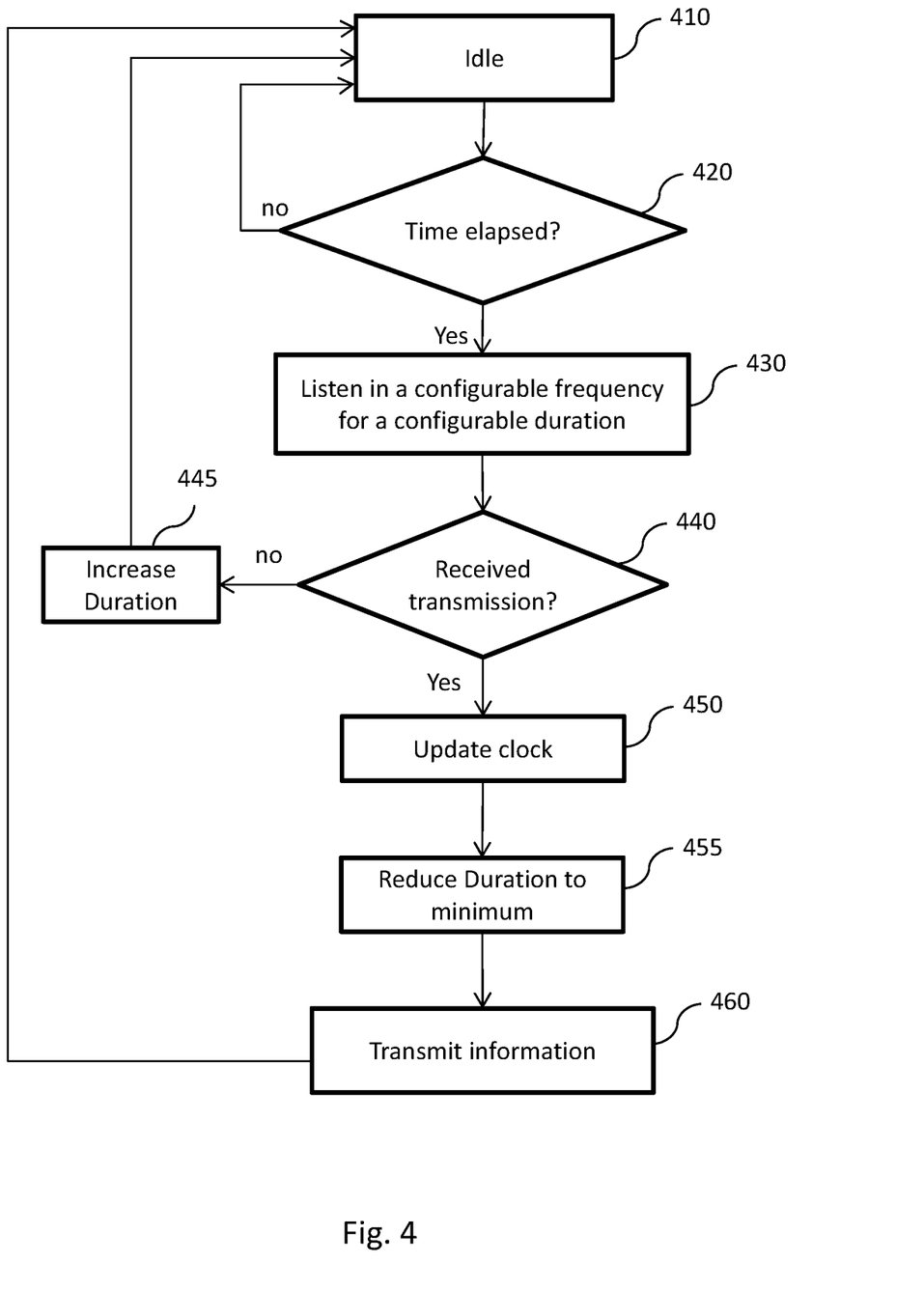
FIG. 4 is s a schematic illustration of a flow for controlling a receive operation of a location tracker IoT device, constructed and operative in accordance with an embodiment of the present invention.

FIG. 4, to which reference is now made, is a schematic illustration of a flow for controlling a receive operation of location tracker 120 that may be implemented by processor 126.

The flow may start in step 410 which is an idle state waiting for time to elapse. It may be noted that in this state, the battery consumption is minimal. In step 420, processor 126 may check if the time has elapsed, i.e., the agreed coordinated timeslot for listening has arrived. If the time has not yet come, processor 126 may return to idle state in step 410. If the agreed coordinated time has come, in step 430 processor 126 may listen to transmission in a configurable frequency for a configurable duration. In step 440 processor 126 may check if a transmission has been received. If a transmission has not been received processor 126 may continue to step 445 and increase the listening duration and then return to the idle state in step 410. If a transmission has been received, processor 126 may continue to step 450 where the clock of location tracker 120 may be synchronized according to information extracted from the received transmission. Processor 126 may continue to step 455 and decrease the listening duration to minimum (after the clock has been updated based on received transmission, the clocks of load monitor 110 and location tracker 120 may be synchronized and the time slot may be accurate reducing the needed listening duration). Processor 126 may continue to step 460 and transmit information to application 130 and then return to the idle step in step 410.

It may be noted that after receiving a transmission, location tracker 120 may both send data to application 130 and update its clock. The clock update may depend on received information (that may include time) as well as on configuration. Since a transmission always starts at specific coordinated timeslot of the load monitor 110 (i.e., transmits at a full second), location tracker 120 may adjust the clock to match the clock of load monitor 110 (adjust the full second).

Figure 5:
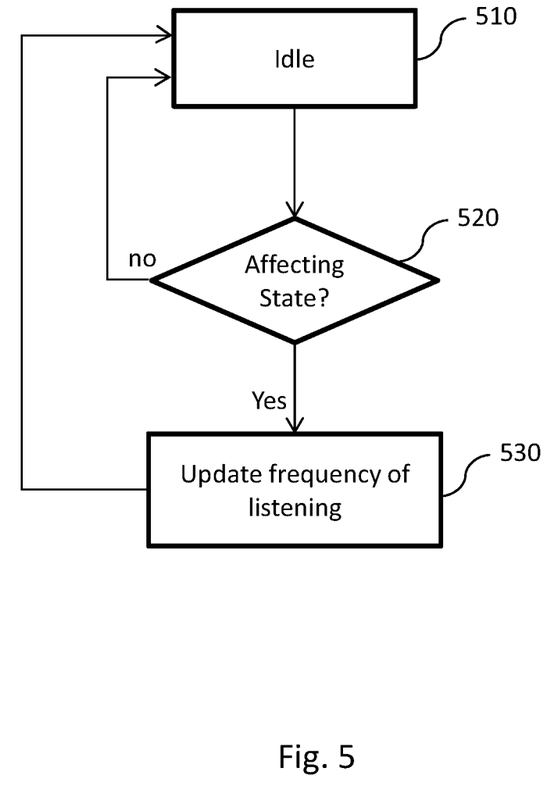
FIG. 5 is a schematic illustration of a flow for updating the listening parameters of location tracker IoT device constructed and operative in accordance with an embodiment of the present invention.

FIG. 5, to which reference is now made, is a schematic illustration of a flow that may be implemented by processor 126 (of location tracker 120) to adjust the frequency and duration of listening.

The flow may start in step 510 which is an idle state waiting for an affecting state. In step 520, processor 126 may check if there is an affecting state. If an affecting state was not detected by processor 126 may return to the idle state in step 510. If an affecting state has been detected, processor 126 may move to step 530 where the listening timing parameters—duration and frequency may be updated, and processor 126 may then return to the idle state of step 510.

An affecting state is any condition or a combination of conditions that may be sensed by any of the sensors of location tracker 120. As already mentioned herein above the affecting state may depend on location, motion characteristics (e.g., stopping, starting, accelerating, decelerating, etc.,) environmental condition (e.g., existence of a nearby object, light condition, sound. Etc.,) time dependent (e.g., a configurable time has elapsed, etc.,) and the like.

To ensure receiving a transmission from load monitor 110, location tracker 120 may start listening in a preconfigured time—the full second, for a preconfigured duration—a window in which the receiver is listening. Load monitor 110 may start transmitting in a predefined point in time such as the full second (load monitor 110 and location tracker 120 may be configured with the same time related configuration and may synchronize periodically). Load monitor 110 may repeatedly transmit the information for a predefined duration every predetermined time (e.g., every full second) and location tracker 120 may update the clock based on received data from load monitor 110 and decrease back the listening duration to minimum after the clock is synchronized. For example, if load monitor 110 transmits a few milliseconds every full second for a few consecutive transmissions, each transmission lasts several milliseconds, listening a whole second may ensure receiving the transmission. If the location tracker 120 listens every minute for a whole second a transmission will be certainly received in a maximum delay of a minute. As the time elapsed from last received transmission grows, the listening duration may be increased by a couple of milliseconds and the time slot may move backwards a couple of milliseconds. When a transmission is received the time slot may be updated and the duration may be reduced back to the minimum.

Application 130 may provide a user interface to display the location and load status of the dollies as well as various statistics. In addition, application 130 may send configuration parameters to location tracker 120 that may be further transmitted to load monitors 110.

Application 130 may use artificial intelligence (AI) to further improve the battery consumption of the load monitors 110 and location tracker 120 by learning the conditions in which the load change. The AI may learn the behavior of the dollies over time and may adjust timing configuration parameters related to frequency and/or duration and send them to the load monitors 110 and location tracker 120.

Application 130 may learn in which situations the load is more likely to change, in which locations the dollies are loaded and in which locations they are unloaded, which movement patterns imply that a load of a dolly may change, which light and sound conditions imply that a load of a dolly may change etc. and may adjust timing configuration parameters accordingly.

It may be noted that embodiments of the invention utilize IoT technology to provide an easy to use and long-lasting load and location tracking units 100 for detecting the presence or absence of a load on a dolly and transmitting this information, along with the dolly's location to application 130 installed in a back office which may further provide statistics related to the usage of the dollies It may be appreciated that the steps shown for the flows herein above are not intended to be limiting and that each flow may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

What is claimed is:

1. A load and location tracking system installed on a wheeled platform, the system comprising:
    a load monitor device installed at a first position on the wheeled platform, the first position being suitable for detecting load-related attributes that reflect the presence or absence of load on the wheeled platform, the load monitor configured to sense a set of load-related attributes and wirelessly transmit the load-related attributes in a first transmission; and
    a location tracker device installed at a second position on the wheeled platform, the second position being suitable for providing RF communication and, the location tracker configured to wirelessly receive the first transmission, sense a set of location-related attributes and wirelessly transmit the load-related attributes taken from the first transmission, the location-related attributes and an identifier identifying the wheeled platform to an application,
    wherein the application is configured to determine the location of the wheeled platform based on the location-related attributes, determine whether a load is present on the wheeled platform based on the load-related attributes, and provide the determined location and load status of the wheeled platform identified by the identifier to a user.

2. The system of claim 1 wherein the load monitor and the location tracker use a low-power communication protocol.

3. The system of claim 1 wherein the load monitor device comprises a plurality of load sensors and a plurality of additional sensors, wherein each additional sensor is any of: an accelerometer, a proximity sensor, a light sensor, a Near Field Communication (NFC) sensor and a sound sensor.

4. The system of claim 1 wherein the location tracker device comprises a location sensor and a plurality of additional sensors wherein each additional sensor is any of an accelerometer, a proximity sensor, a light sensor, a Near Field Communication (NFC) sensor, and a sound sensor.

5. The system of claim 1 wherein a clock of the location tracker is synchronized with a clock of the load monitor to match an agreed and coordinated timeslot wherein the load monitor configured to start transmitting in the agreed and coordinated timeslot and the location tracker configured to start receiving in the agreed and coordinated timeslot.

6. The system of claim 1 wherein the load monitor device is configured to repeatedly transmit in a specific frequency for a first duration and the location tracker device is configured to receive for a second duration.

7. The system of claim 6 wherein the timeslot and the duration depend on a time elapsed from a previous reception of the first transmission.

8. The system of claim 1 wherein the load monitor device is configured to transmit when a first condition is met, and the location tracker device is configured to receive when a second condition is met, the first and second conditions depend on any of: location, motion characteristics, environmental conditions and time.

9. The system of claim 1 further comprising an application running on a computing device with a processor and a memory, the application configured to receive the load related attributes, the location related attributes and the identifier and present the location, the load and the identifier on a display.

10. The system of claim 9 wherein the application is configured to learn states associated with change of the load related attributes, and to send a first command to the location tracker, the first command includes configuration parameters related to the first and the second conditions, and the location tracker configured to send a second command to the load monitor the second command includes configuration parameters related to the first condition.

11. A method for tracking a location and a load status of a wheeled platform, the method comprising:
    sensing, by a first device, installed at a first position on the wheeled platform, one or more load-related attributes, wherein the first position is suitable for detecting a presence or absence of a load;
    wirelessly transmitting, from the first device, a first transmission including the load-related attributes to a second device;
    wirelessly receiving, by the second device, installed in a second position on the wheeled platform, the first transmission, wherein the second position is suitable for RF communication;
    sensing, by the second device, one or more location-related attributes;
    sending, from the second device, the load-related attributes extracted from the first transmission, the location-related attributes and an identifier identifying the wheeled platform;
    receiving by an application the load-related attributes, the location-related attributes and the identifier; and
    providing, by the application, information indicating the location and the load status of the wheeled platform.

12. The method of claim 11 wherein the wirelessly transmitting and the wirelessly receiving use a low-power communication protocol.

13. The method of claim 11 wherein the wirelessly transmitting further comprising:
- receiving a trigger, the trigger depends on any of: location attributes, motion characteristics, environmental conditions and time;
- sensing the load-related attributes after receiving the trigger;
- evaluating a load condition by comparing the load-related attributes with a preconfigured load state; and
- start wirelessly transmitting the load related attributes in a coordinated timeslot, in a specified frequency for a configured duration if the condition is satisfied.

14. The method of claim 13 wherein the wirelessly receiving further comprises:
- waiting for the coordinated timeslot;
- listening for a configured duration, the duration depends on a time elapsed from a previous reception of the first transmission; and
- updating a clock according to the first transmission.

15. The method of claim 14 further comprising updating the configured duration when a condition is met, the condition depends on any of: location, motion characteristics, environmental status and time.

* * * * *